R. H. Osgood,
Saw.
Nº 25,214. Patented Aug 23, 1859.
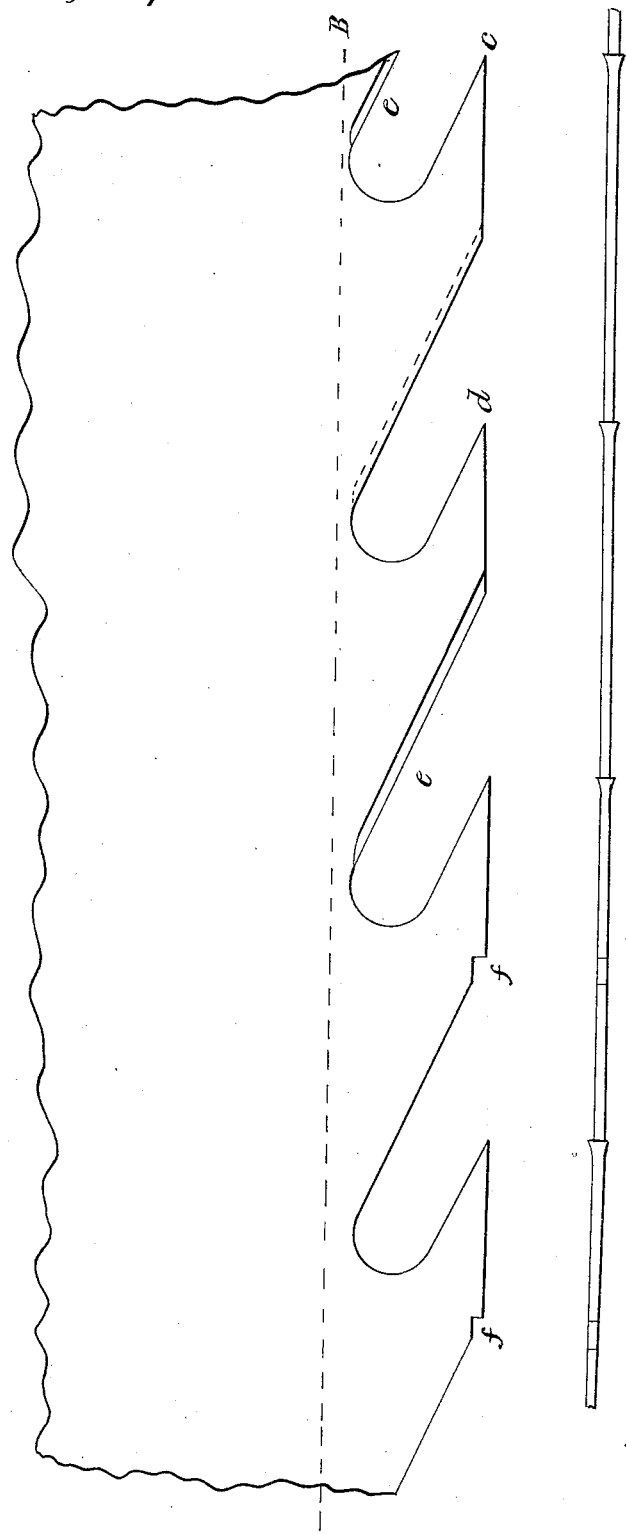
Inventor:
R. H. Osgood.

UNITED STATES PATENT OFFICE.

RICHD. H. OSGOOD, OF COLUMBUS, OHIO.

RECIPROCATING SAW.

Specification of Letters Patent No. 25,214, dated August 23, 1859.

*To all whom it may concern:*

Be it known that I, RICHARD H. OSGOOD, of Columbus, in the county of Franklin and State of Ohio, have invented a new and Improved Form for the Teeth of Saws; and I do hereby declare that the following is a full and exact description, to wit:

The nature of my invention consists in providing square notches on the upper corner, or top front, of those of the teeth which do not pass through the whole of the log, or timber, for the purpose of more easily raising the sawdust from the kerf.

To enable others, skilled in the art, to make and use my invention, I will proceed to describe its construction and operation, reference being made to the accompanying drawings—Figure 1 being a fragmentary side view and Fig. 2 a fragmentary front view of a portion of the teeth of a saw.

In a saw for sawing boards from an ordinary mill-log, the teeth should be from five to six inches apart; thus on an ordinary six foot saw should contain about ten or twelve teeth.

A, B, Fig. 1, represents the line of motion of the saw frame; commencing at the point of the lowest or bottom tooth, I strike a line $(c, d,)$ parallel to the line A, B, said parallel line $(c, d,)$ forming the front of the lower tooth. I decide on the number of teeth I intend to form, and the desired cut I wish to give each stroke, and then calculate what each tooth will cut, and advance the second tooth from the parallel line forming the front of the first tooth, the desired cut; and from the point of the second tooth, I strike another line parallel with the line of motion, A, B, (and also with the line $c, d,$) which line forms the front of the second tooth; and thus from the point of each tooth I strike a similar parallel line to the line of motion, on which I strike and form the front of each tooth.

In hanging the saw in the frame, the top is advanced so that the front of each tooth, $(c, d,)$ shall be parallel to the line of motion (A, B,) of the saw frame, whereby the whole length of the front of each tooth will move in the same right line; and cut the timber, like the bit of a plane, evenly and smoothly from the point where the tooth strikes; each tooth striking in advance of the preceding or lower one, the distance between the said parallel lines forming the fronts of the several teeth. In this manner each tooth can be made to cut an equal amount of the log; and as the parallel fronts of the teeth prevents any disposition to cut other than in a straight line, by pressing against the solid timber, the tooth can be dressed to a sharp cutting edge on the under side, at an angle sufficient to allow the necessary strength to the metal. As each tooth will cut a chip, it is necessary to cause sufficient space between the teeth to receive the chips or saw-dust, and carry them through the log; so I cut out one half the distance between the points of the teeth, and about one and a half inches deep. The points, or cutting edges, of the teeth may receive the necessary breadth (to prevent the saw from pinching) in the usual manner (see Fig. 2) by a punch or set. The tops of as many of the teeth as pass through the log, I bevel in the manner represented at $e$, Fig. 1, for the purpose of causing the sawdust to fall therefrom the more readily, and also to serve to loosen any that may be disposed to stick to the log in the ascent of the saw; and the upper teeth I provide with notches about three eighths or half an inch deep, as represented at $f, f,$ Fig. 1, on the upper front corner, for the purpose of more readily raising the sawdust from the kerf.

What I claim as my invention, and desire to secure by Letters Patent, is—

Providing the upper edges of saw teeth with notches $(f, f,$ Fig. 1,) substantially as described and represented, for the purpose of assisting to clear the kerf of sawdust.

R. H. OSGOOD.

Witnesses:
R. S. LOOKER,
ED. LILLY.